US008103598B2

(12) United States Patent
Minka et al.

(10) Patent No.: US 8,103,598 B2
(45) Date of Patent: Jan. 24, 2012

(54) COMPILER FOR PROBABILISTIC PROGRAMS

(75) Inventors: Thomas Minka, Cambridge (GB); John Winn, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 12/143,425

(22) Filed: Jun. 20, 2008

(65) Prior Publication Data

US 2009/0319458 A1    Dec. 24, 2009

(51) Int. Cl.
*G06F 17/00* (2006.01)
*G06F 17/20* (2006.01)

(52) U.S. Cl. ........................................................ 706/11
(58) Field of Classification Search ...................... 706/11
See application file for complete search history.

(56) References Cited

U.S. PATENT DOCUMENTS

| | | | |
|---|---|---|---|
| 6,262,730 | B1 | 7/2001 | Horvitz et al. |
| 6,556,960 | B1 | 4/2003 | Bishop et al. |
| 6,691,122 | B1 | 2/2004 | Witte et al. |
| 7,050,868 | B1 | 5/2006 | Graepel et al. |
| 7,200,563 | B1 | 4/2007 | Hammitt et al. |
| 2006/0010090 | A1 | 1/2006 | Brockway et al. |
| 2006/0294037 | A1 | 12/2006 | Horvitz et al. |
| 2007/0273558 | A1 | 11/2007 | Smith et al. |

FOREIGN PATENT DOCUMENTS

WO     WO0070481     11/2000

OTHER PUBLICATIONS

'How computer work': White, 2003, Que publishing.*
'Variational message passing and its applications': Winn, 2004, University of Cambridge.*
'An image browser database that learns from user interaction': Minka, 1996, MIT media lab.*
'A family of algorithms for approximate Bayesian inference': Minka, 2001, MIT.*
Murphy, K. A brief introduction to graphical models and Bayesian networks 1998 [retrieved on Sep. 22, 2011] Retrieved from the Internet :<ULR:http://www.cs.ubc.ca/~murphyk/Bayes/bnintro.html>.*
Murphy, K. Software for graphical models: A review, 2007, [retrieved on Sep. 22, 2010] Retrieved from the Internet :<http://www.cs.ubc.ca/~murphyk/Software/bnsw.pdf>.*
Bishop, et al., VIBES: A Variational Inference Engine for Bayesian Networks, Advances in Neural Information Processing Systems, vol. 15, 2002, pp. 793-800.
HBC: Hierarchical Bayes Compiler, retrieved on Apr. 9, 2008 at <<http://www.cs.utah.edu/~hal/HBC/>>, pp. 1-3.

(Continued)

*Primary Examiner* — Kakali Chaki
*Assistant Examiner* — Peter Coughlan
(74) *Attorney, Agent, or Firm* — Lee & Hayes, PLLC

(57) ABSTRACT

A compiler for probabilistic programs is described. The inputs to the compiler are a definition of a model and a set of inference queries. The model definition is written as a probabilistic program which describes a system of interest. The compiler transforms statements in the probabilistic program to generate source code which performs the specified queries on the model. The source code may subsequently be compiled into a compiled algorithm and executed using data about the system. The execution of the compiled algorithm can be repeated with different data or parameter settings without requiring any recompiling of the algorithm.

20 Claims, 10 Drawing Sheets

OTHER PUBLICATIONS

Korb, et al., Software Packages, Appendix B in Bayesian Artificial Intelligence, retrieved at <<http://www.csse.monash.edu.au/bai/book/appendix_b.pdf>>, pp. 317-331.

Minka, et al., Infer.NET, retrieved on Jul. 16, 2008 at <<http://research.microsoft.com/mlp/ml/infer/infer.htm>>, Microsoft Research Cambridge, pp. 1-2.

Murphy, Software for Graphical Models: A Review, ISBA Bulletin, Dec. 2007, pp. 1-3.

Murphy, Software Packages for Graphical Models/Bayesian Networks, retrieved on Jul. 16, 2008 at <<http://www.cs.ubc.ca/~murphyk/Software/bnsoft.html>>, pp. 1-6.

Project e-motion, retrieved on Apr. 10, 2008 at <<http://ralyx.inria.fr/2005/Raweb/e-motion/uid71.html>>, pp. 1-6

Terry, et al., A Bayesian Net Inference Tool for Hidden State in Texas Hold'em Poker, retrieved on Apr. 9, 2008 at <<http://ocw.mit.edu/NR/rdonlyres/Aeronautics-and-Astronautics/16-412JSpring-2005/26C3A790-77CA-460A-B97B-CE26E3BFCCF4/0/mihokterry.pdf>>.

UnBBayes, retrieved on Apr. 10, 2008 at <<http://sourceforge.net/projects/unbbayes>>, SourceForge.net, pp. 1-2.

Winn, at al., CSOFT: Probablistic modelling in C#, retrieved on Jul. 16, 2008 at <<http://research.microsoft.com/mlp/ml/Infer/Csoft.htm>>, Microsoft Research Cambridge, p. 1.

Winn, et al., Expectation Propagation & Variational Message Passing a comparison using Infer.NET, NIPS '07 Workshop on Approximate Bayesian Inference in Continuous/Hybrid Models, Dec. 7, 2007.

* cited by examiner

US 8,103,598 B2

COMPILER FOR PROBABILISTIC PROGRAMS

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Probabilistic inference algorithms may be used to explore many different systems. For example, a probabilistic inference algorithm may be used to infer attributes of search results, such as how relevant they are and how well they are summarized, based on how the user interacts with the search results. It is currently both difficult and time-consuming to write software to implement efficient probabilistic inference algorithms. Typically it may take a few days to create a model of a system and many weeks to create the code to implement the probabilistic inference algorithm. If the model is subsequently to be explored using a different inference algorithm (e.g. Expectation Propagation instead of Variational Message Passing), the code must be re-written, which again takes many weeks.

The embodiments described below are not limited to implementations which solve any or all of the disadvantages of known methods of generating probabilistic inference algorithms.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A compiler for probabilistic programs is described. The inputs to the compiler are a definition of a model and a set of inference queries. The model definition is written as a probabilistic program which describes a system of interest. The compiler transforms statements in the probabilistic program to generate source code which performs the specified queries on the model. The source code may subsequently be compiled into a compiled algorithm and executed using data about the system. The execution of the compiled algorithm can be repeated with different data or parameter settings without requiring any recompiling of the algorithm.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
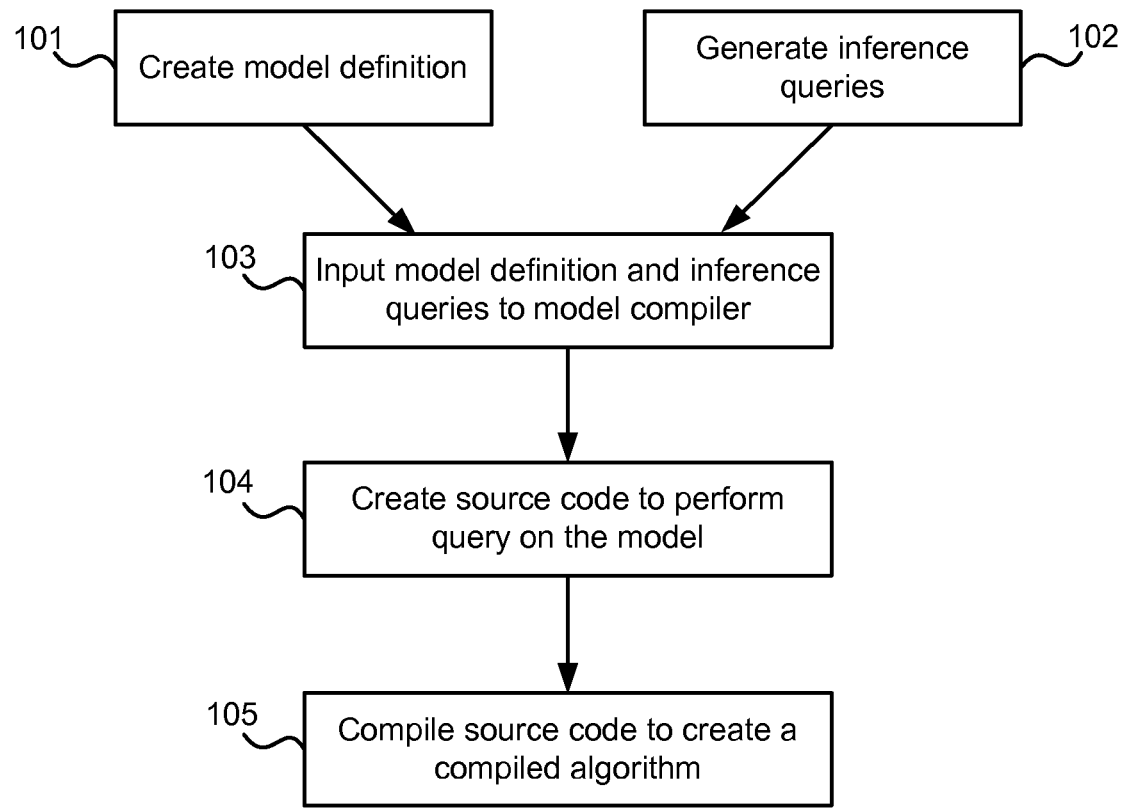
FIG. 1 is a flow diagram of an example method of generating a probabilistic inference algorithm.

FIG. 1 is a flow diagram of an example method of generating a probabilistic inference algorithm which compiles a model definition into the source code needed to compute a set of inference queries on the model. The model definition describes the system of interest (e.g. the relationships between inputs and outcomes) and the inference queries define the output information that is required. For example the model may describe the relationship between user interaction with set of search results and attributes of search results such as how relevant they are and how well they are summarized. The probabilistic inference algorithm may be used to provide an indication of the relevance of a document and an indication of the quality of a summary of a document given data on user input.

In the method shown in FIG. 1, a model definition is created (block 101) and a set of inference queries are generated (block 102). These may be created by a user and may be written in the form of a probabilistic program, which may be a relatively short program (see example below in the description of FIG. 4). Alternatively, the model definition may be automatically generated (e.g. by modeling API calls). The user inputs the model definition and inference queries to a model compiler (block 103) which creates the source code needed to perform those queries on the model, using a specified inference algorithm (block 104). This source code may be written to a file and used directly if required. The source code is then compiled to create a compiled algorithm (block 105).

In an example, the compiled algorithm may be used in inferring relevance of images. Each image may be labeled with a number of keywords and the compiled algorithm may be used to classify the images based on how a user classifies a small number of the images. The compiled algorithm may be integrated within an application which displays the images, enables user input to classify a few images and then automatically classifies the remaining images based on the output of the inference algorithm.

Figure 2:
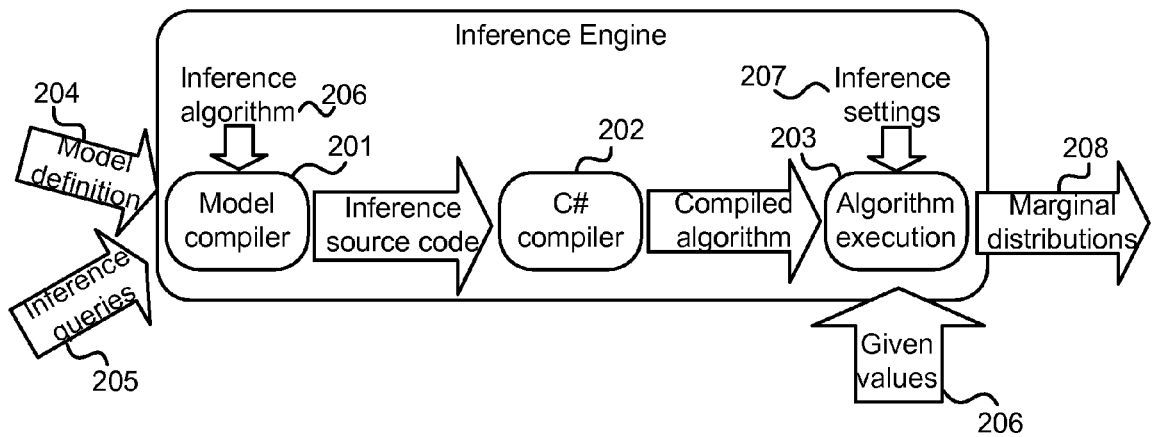
FIG. 2 shows a schematic diagram of an inference engine.

Having generated a compiled algorithm (in block 105), the algorithm may be manually executed (e.g. to get fine-grained control of how inference is performed). Alternatively an inference engine, which comprises the model compiler and the source code compiler, may be used to execute the compiled algorithm. FIG. 2 shows a schematic diagram of a such an inference engine 200 which comprises a model compiler 201, a C# compiler 202 (although a different language compiler may be used dependent upon the language in which the source code is generated by the model compiler) and an algorithm execution module 203. The inference engine 200 has a number of inputs: the model definition 204, the inference queries 205 and the data (or given values) 206. The inference engine 200 also has a number of settings, which may be user specified, such as the choice of inference algorithm 207 to be used and any inference settings 208 such as the number of iterations to perform. Once the C# compiler 202 has generated the compiled algorithm, the algorithm execution module 203 executes the compiled algorithm, according to the user-specified settings 208 and based on the set of given values 206 (such as arrays of data), so as to produce the marginal distributions 208 requested in the queries.

The method and inference engine described above provides an automatic way of generating a compiled algorithm and in some cases the marginal distributions themselves. The compiled algorithm can be executed repeatedly for different settings of the given values without recompiling the algorithm and where a different inference algorithm is required, the inference engine can be re-run (e.g. by repeating blocks 104-105) without requiring the model to be re-written. In the search results example described above, the algorithm may be re-run using user input data in relation to a different set of search results in order to infer the relevance of each of the results.

The method and architecture described above provides very efficient resultant code (i.e. the compiled algorithm) both in terms of speed and memory. Due to the use of a compiler architecture (as shown in FIG. 2), a much wider range of inference problems can be handled than previous tools which tended to be restricted to particular classes of problem or algorithm. The compiler architecture also enables use of existing tools for profiling and debugging the inference procedure (e.g. debugging tools, visual editors etc). As described above, different inference algorithms may be used and different algorithms may even be used within the same program. The compiler allows variables of many different types including discrete and continuous, but also compound and object types and the compiler may be extended with new distributions, model elements and inference algorithms as required.

There are many different applications for the use of the inference engine and methods described above. Examples include:

A probabilistic program describing how a user interacts with a set of search results can be compiled into a program which can take data about user interactions and infer attributes of search results, such as how well they are summarized and how relevant they are to the user.

In an online game, the results of a set of games can be processed to infer the skill level of each participant. This would be achieved by using the inference engine (or methods) described herein to compile a program describing how the player's skill levels affect the outcome of the game.

In a company developing pharmaceutical products, a program can be developed representing how a particular biological system functions. By compiling this program using the methods described herein and attaching observed biochemical data and patient information, predictions can be made about drug toxicity, gene function, biological pathways etc.

In a user interface, a model of user behavior can be compiled and used to infer what the user is trying to achieve. The user interface can then make suggestions to the user, allowing predicted operations to be performed much more quickly.

The following description describes aspects of the model compiler 201 in more detail. It will be appreciated that the model compiler may be integrated within an inference engine 200, as shown in FIG. 2, or may be implemented separately. In another example, the model compiler 201 and C# compiler 202 may be combined into an engine which generates a compiled algorithm (e.g. as shown in FIG. 1) which may be executed manually or using an algorithm execution engine 203.

Figure 3:
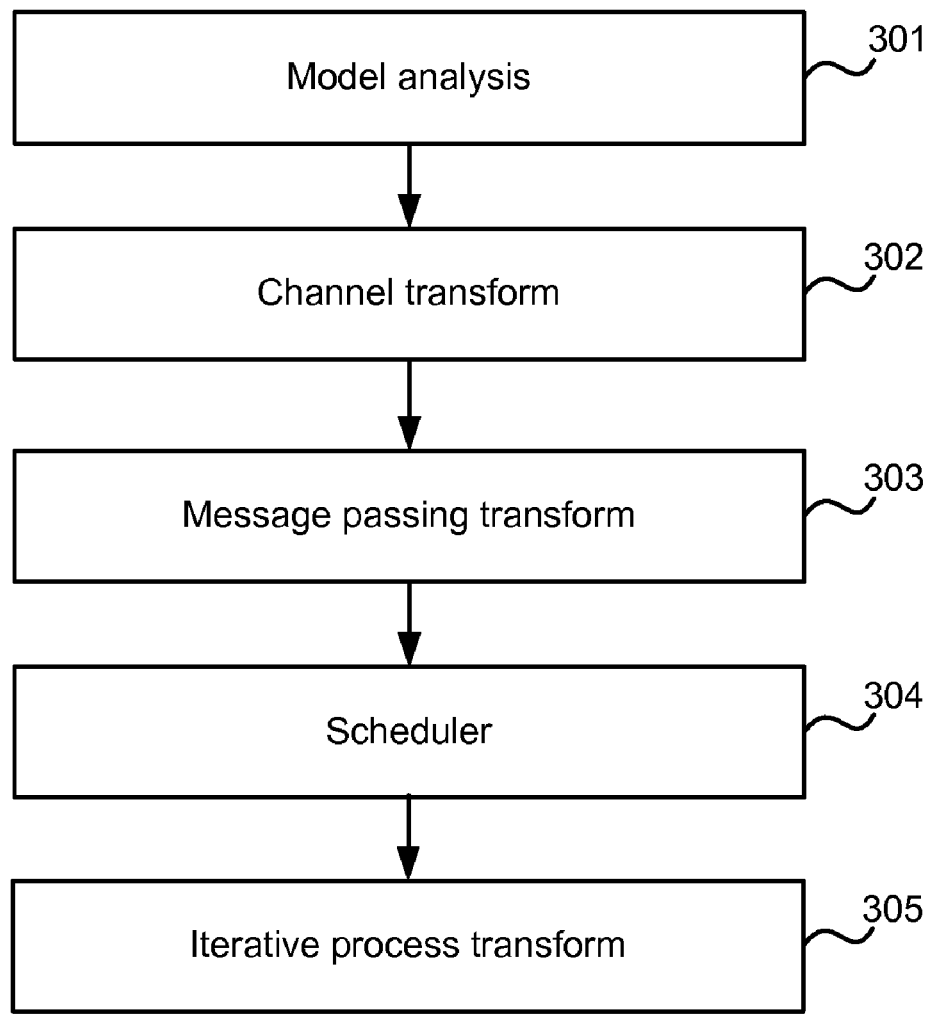
FIG. 3 shows a flow diagram of an example method of operation of a model compiler.

The model compiler takes an input probabilistic program (which comprises the model definition and the inference queries) and performs a series of actions on it. FIG. 3 shows a flow diagram of an example method of operation of the model compiler which comprises five actions: model analysis transform 301, channel transform 302, message passing transform 303, scheduling transform 304 and iterative process transform 305. The model analysis transform (block 301) comprises determining which variables in the input program are random and which are ordinary. The channel transform (block 302) converts declarations and references to random variables into channels, such that the declaration of a variable and each use of the variable is a separate channel. The message passing transform (block 303) converts channels into pairs of forward/backwards messages and inserts message operators to compute these messages, given other messages and deterministic variables. The form of these operators will depend on the probabilistic inference algorithm being used. The scheduler (block 304) takes all the message computations (or statements) which need to be performed and schedules them into a, possibly iterative, linear inference program. The iterative process transform (block 305) converts an inference method into a class which implements the IterativeProcess interface, enabling the inference procedure to be executed in a consistent way from external code. It promotes local variables to fields and places parts of the inference into different methods, e.g. Initialize( ), Update( ). The resultant program is then output, compiled (e.g. using C# compiler 202) and can be executed to solve the inference problem (e.g. using algorithm execution module 203). These method blocks are described in more detail below.

The model analysis transform (block 301) analyses the input model (which may be referred to as the Model Specification Language (MSL)) to determine stochasticity and adds annotations, e.g. in the form of attributes, to code elements. This method block therefore identifies those variables which are actually random and therefore need to be processed by the inference algorithm. A set of rules may be used to identify random variables and to determine the attributes to be added. Special statements may be used to directly define attributes on variables. These statements are removed from the output code. The following table shows an example of the rules that may be applied to add attributes and it will be appreciated that these are provided by way of example only and an implementation may implement some or all of these rules and/or different rules.

| Attribute | Element | Meaning | When it will be attached |
|---|---|---|---|
| MarginalPrototype | Variable declaration | The marginal prototype that will be used for this variable, or for its elements if the variable is an array. | When the variable is assigned the result of a factor with a known MarginalPrototype rule, e.g. Factor.Random and Factor.Replicate. |
| Stochastic | Variable declaration | The variable is known to be stochastic. | When analysis determines that it has been assigned a non-deterministic value. |
| IsConstant | Variable declaration | The variable is known to be constant. | When analysis determines that it has a constant value throughout. |
| VariableInformation | Variable declaration | Information about the variable e.g. its type, array size etc. | For all variables. |
| FactorInfo | Method invoke expression | Holds information about the factor this method corresponds to. | To any static factor method. |

If later method blocks introduce new variables, the same attributes may be added as would have been added by the model analysis transform (in block 301).

The following tables show examples of transforms which may be performed within the model analysis transform, for the different attributes. The first table relates to the MarginalPrototype attribute:

| Input | Output |
|---|---|
| Attrib.Var(b,new MarginalPrototype(expr));<br>bool b; | b.MarginalPrototype.expression="expr"<br>nothing |
| b = Factor.Random(prior); | b.MarginalPrototype.expression="prior" |
| bools[i] = Factor.Random(priorArray[i]); | bools.MarginalPrototype.expression="priorArray[0]" |
| bools = Factor.Replicate(b); | bools.MarginalPrototype = b.MarginalPrototype |
| b = Factor.GetItem(bools, index); | b.MarginalPrototype = bools.MarginalPrototype |
| vec = Factor.VectorGaussian(meanVec,precMat) | vec.MarginalPrototype = meanVec.MarginalPrototype |
| d = Factor.Discrete(constVec); | d.MarginalPrototype.expression = "new Discrete(constVec.Count)" |
| discretes[i] = Factor.Discrete(constVec[i]); | discretes.MarginalPrototype.expression = "new Discrete(constVec[0].Count)" |
| d = Factor.Discrete(dirichletVec); | d.MarginalPrototype.expression = "new Discrete("+dirichletVec.MarginalPrototype.expression+".Dimension)" |

The second table relates to the Stochastic and IsConstant attributes:

| Input | Output |
|---|---|
| bool b; | nothing |
| b = true; | b.IsConstant |
| b = constBool & givenBool; | b.IsConstant |
| b = constBool & randomBool; | b.Stochastic |
| b = Factor.Bernoulli(0.1); | b.Stochastic |
| bool[ ] bools = new bool[4]; | nothing |
| bools[i] = true; | bools.IsConstant |
| bools[i] = Factor.Bernoulli(0.1); | bools.Stochastic |

The third table relates to the VariableInformation (VarInfo) attribute:

| Input | Output |
|---|---|
| bool b; | b.VarInfo(type="bool", size="") |
| bool[ ] bools = new bool[given]; | bools.VarInfo(type="bool[ ]", size="[given]") |
| bool[ ][ ] jagged = new bool[given][ ];<br>jagged[i] = new bool[sizes[i]]; | jagged.VarInfo(type="bool[ ][ ]", size="[given][sizes[i]]") |

The channel transform (block 302) performs the equivalent of creating a factor graph in code where edges are variables and functions are nodes. This is more general than previous techniques which build a factor graph data structure and then iterate through the graph. The channel transform converts declarations and references to variables (and in particular random variables) into channels, such that the declaration and each use of a variable is a separate channel. Each channel corresponds to an edge in the factor graph. Only stochastic variables are considered and deterministic variables are left unchanged. Other variables with special attributes (e.g. a WillOnlyHaveoneUse attribute) may also be left unchanged.

In a particular example implementation, variable declarations are copied to make a definition and a marginal channel (also referred to as an inference channel which corresponds to an inference edge). An array for the Nuses of the variable is also declared. The three arrays are tied together with a UsesEqualDef factor. All generated declarations are given ChannelInfo attributes which record information such as the variable from which they were generated, the type of the channel, the use count (for use channels) etc. The UsesEqualDef method call is marked with a DeterministicVariable attribute if the variable is defined by a deterministic factor. The following table provides examples of transforms which may be performed on variable declarations. In these examples it is assumed that the variable is marked as stochastic in each case.

| Input | Output |
| --- | --- |
| double x; | double x;<br>double x_marginal;<br>double[ ] x_uses = new double[N];<br>x_uses =<br>Factor.UsesEqualDef<double>(x, x_marginal); |
| bool[ ] barray; | bool[ ] barray;<br>bool[ ] barray_marginal;<br>bool[ ][ ] barray_uses = new bool[N][ ];<br>barray_uses =<br>Factor.UsesEqualDef<bool[ ]>(barray, barray_marginal); |
| bool[ ][ ] jarray; | bool[ ][ ] jarray;<br>bool[ ][ ] jarray_marginal;<br>bool[ ][ ][ ] jarray_uses = new bool[N][ ][ ];<br>jarray_uses =<br>Factor.UsesEqualDef<bool[ ][ ]>(jarray, jarray_marginal); |

Infer statements are modified to refer to the marginal channel variable i.e. Infer(a) transforms to Infer(a_marginal).

Assignments which allocate new arrays are duplicated to create corresponding arrays for the marginal and uses channels. The uses channel allocations are placed in a loop (e.g. a 'for' loop) over the number of uses as shown in the table below of example transforms.

Any stochastic variable reference on the left hand side of an assignment is left unchanged but a check is made to ensure that this only happens once (i.e. there is no mutation). Each edge only has one start and one end and therefore each variable is only used once on each side of an assignment. All other variable references are replaced by a different element of the variable's uses array. The examples in the table below assume the declarations given above:

| RHS reference | In loop over | Output | Effect on N |
| --- | --- | --- | --- |
| x | — | x_uses[n] | Increases by 1 |
| barray | — | barray_uses[n] | Increases by 1 |
| barray[i] | [i] | barray_uses[n][i] | Increases by 1 |
| jarray[i][j] | [i,j] | jarray_uses[n][i][j] | Increases by 1 |
| barray[0] | — | barray_usesn[0][n_lit] | If n_lit is not yet defined, set it to N and increase N by 1. Otherwise use the existing value of n_lit. |

As described above, N is the total number of uses. The table above shows the effect on N when the given expression is encountered.

The message passing transform (block 303) transforms a model specified in terms of channels into the set of message passing operations required to perform inference in that model. In particular the message passing transform converts channels into pairs of forward and backward messages and inserts message operators to compute these messages, given other messages and deterministic variables. The messages comprise distributions over random values and the form of these messages depends on the probabilistic inference algorithm being used.

Figure 4:
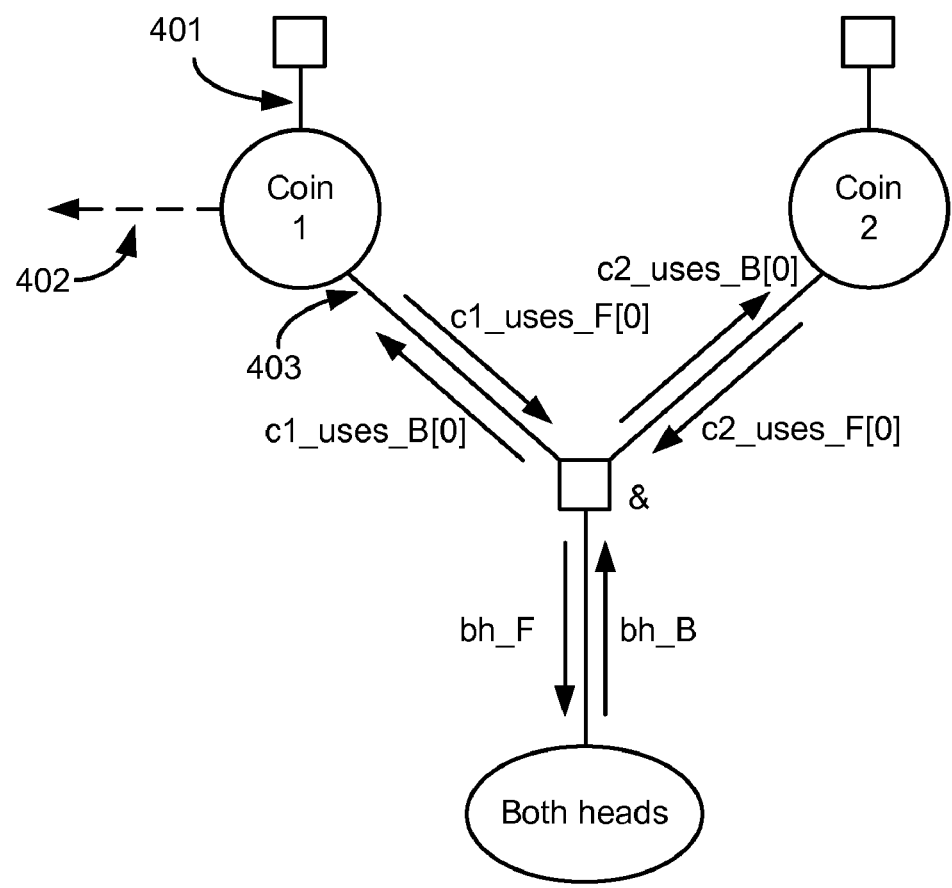
FIG. 4 is a factor graph.

A simple example is shown graphically in FIG. 4. FIG. 4 is a factor graph which may be used to determine the probability that tossing two coins results in both heads being uppermost given a value (i.e. head/tail) for one of the coins (coin 1). The graph shows a definition edge 401, an inference (or marginal edge) 402 and a use edge 403. Each coin variable is treated as a message operator which takes in and generates messages. The forward and backward messages are shown and labeled.

| Input | Output |
| --- | --- |
| x = Factor.Gaussian(0,1);<br>barray = new bool[2]; | x = Factor.Gaussian(0,1);<br>barray = new bool[2];<br>barray_marginal = new bool[2];<br>for (int _ind = 0; _ind < barray_uses.Length; _ind++)<br>{<br>  barray_uses[_ind] = new bool[2];<br>} |
| jarray = new bool[2][ ]; | jarray = new bool[2][ ];<br>jarray_marginal = new bool[2][ ];<br>for (int _ind = 0; _ind < jarray_uses.Length; _ind++)<br>{<br>  jarray_uses[_ind][ ] = new bool[2][ ];<br>} |
| jarray[i] = new bool[sizes[i]]; | jarray[i] = new bool[sizes[i]];<br>jarray_marginal[i] = new bool[sizes[i]];<br>for (int _ind = 0; _ind < jarray_uses.Length; _ind++)<br>{<br>  jarray_uses[_ind][i] = new bool[sizes[i]];<br>} |

The probabilistic program (model definition 101) which corresponds to the example shown in FIG. 4 is:
  bool firstCoin=Bernoulli(0.5);
  bool secondCoin=Bernoulli(0.5);
  bool bothHeads=firstCoin & secondcoin;
In an example implementation, the message passing transform may comprise:
  converting channel variable declarations into a pair of declarations for messages passed forwards and backwards along that channel;
  initializing message variables with appropriate marginal prototypes or initial values;
  converting each method call into several operator method calls, e.g. one for the return value and one for each argument; and
  removing if statements and creating evidence message operator method calls.

The following two tables show example transforms which may be performed on variable declarations and array declarations. In the tables only the forward messages are shown—the backward messages are identical but with _B instead of _F.

| Input | Output | Notes |
|---|---|---|
| double x; | Gaussian x_F = marginalPrototypeExpression; | Definition channel |
| double[ ] xarr; | DistributionArray<Gaussian> xarr_F; | Uses channel |
| double[ ] x_uses; | Gaussian[ ] x_uses_F; | Definition channel |
| bool[ ][ ] b; | DistributionArray<DistributionArray<Bernoulli>> b_F; | Uses channel |
| bool[ ][ ] b_uses; | DistributionArray<Bernoulli>[ ] b_uses_F; | |
| xarr = new double[2]; | xarr_F = new DistributionArray<Gaussian>(marginalPrototypeExpression,2) | Definition channel |
| x_uses = new double[2]; | x_uses_F = ArrayHelper.Fill(new Gaussian[2],marginalPrototypeExpression) | Uses channel |
| b = new bool[10][ ] | b_F = new DistributionArray<DistributionArray<Bernoulli>>(10); | Definition channel |
| b_uses = new bool[10][ ] | b_uses_F = new DistributionArray<Bernoulli>[10]; | Uses channel |
| b[i] = new bool[sizes[i]] | b_F[i] = new DistributionArray<Bernoulli>(marginalPrototypeExpression,sizes[i]) | Definition channel |
| b_uses[i] = new bool[6]; | b_uses_F[i] = new DistributionArray<Bernoulli>(marginalPrototypeExpression,6); | Uses channel (same as for definition channel in this case) |
| jarray[i] = new bool[sizes[i]]; | b_uses_F[i] = new DistributionArray<Bernoulli>(marginalPrototypeExpression,sizes[i]); | |

Generated variable declarations are marked with MessageArrayInformation attributes and array declarations are converted into DistributionArray declarations (except at the top level of a uses channel).

The following table shows examples of transforms for method calls. As described above, static method calls are converted into multiple message operators. Operators are not created for deterministic arguments and deterministic methods with deterministic arguments are left unchanged. The operator method which is called depends upon the original static method and the probabilistic inference algorithm being used. Operators assign to backwards messages for arguments and forward messages for return values.

| Input | Output | Notes |
|---|---|---|
| x=Factor.And(true,false); | x=Factor.And(true,false); | Entirely deterministic |
| y=Factor.Gaussian(m,1.0); | y_F=GaussianOp.SampleAverageConditional(m_F,1.0);<br>m_B=GaussianOp.MeanAverageConditional(y_B,1.0); | Forward message to y, backward message to m |
| if (a) {<br>y=Factor.Gaussian(m,1.0);<br>} | a_B=Bernoulli.FromLogOdds(GaussianOp.LogEvidenceRatio(y_B,m_F,1.0));<br>y_F=GaussianOp.SampleAverageConditional(m_F,1.0);<br>m_B=GaussianOp.MeanAverageConditional(y_B,1.0); | Evidence message |

The scheduler (block 304) takes all message computations which need to be performed and schedules them in an appropriate order that respects their dependency requirements. The scheduler creates a linear inference program, which may, in some examples, be an iterative linear inference program. The scheduler reviews all of the message computations and re-structures them to improve efficiency and in some examples, the scheduler may remove computations which are not required, i.e. computations which compute variables which do not affect any of the required output variables. In some examples, message computations may be duplicated in order to satisfy data dependencies, e.g. in the presence of triggers. In a first example, suppose B and C both depend on A and also trigger A; then the schedule must have two occurrences of A, e.g. A,B,A,C. In a second example, suppose B depends on A, C depends on B and A, and B triggers A; then the schedule must have two occurrences of A, e.g. A,B,A,C. The output of the scheduler comprises a sequence of statements to be executed once for initialization purposes and a sequence of statements to be executed repeatedly as part of iterative message passing (which may be distinguished from the initialization statements by being wrapped inside a 'while' loop).

Figure 5:
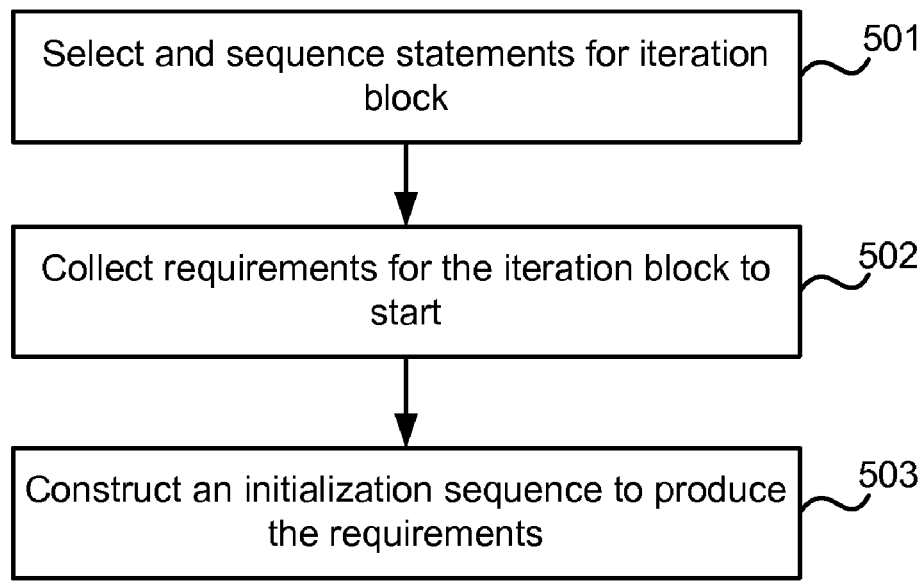
FIG. 5 shows a flow diagram of an example method of operation of a scheduling transform.

FIG. 5 shows a flow diagram of an example method of operation of the scheduler. This method comprises selecting (or pruning) and sequencing the statements for the iteration block (block 501), collecting the requirements for the iteration block to get started (block 502) and constructing an initialization sequence to produce those requirements (block 503). These method blocks are described in more detail below.

The input to the scheduler is a directed dependency graph represented in code form where nodes are messages and edges go from data sources to targets. Each edge is represented in the code by a statement. The graph is constructed by enumerating each assignment statement in the program and drawing an edge from message A to message B if the assignment contains B on the left hand side and A on the right hand side. The graph is created in memory using a graph library. The scheduler also receives as an input a set of output messages whose value must be computed and these may be messages corresponding to marginals of the random variables in the model. Messages whose value is not needed to compute these outputs can be removed (or pruned). The scheduler does not consider the underlying code of the statements or the specific message-passing algorithm (e.g. expectation propagation, variational message passing etc) being executed and so can also be applied to new inference algorithms added by the user.

The edges of the dependency graph are annotated with scheduling requirements. These annotations may be added by an earlier transform, e.g. the message passing transform 303 (or the dependency analysis transform 807 described below) based on attributes marked on each type of message computation. In an example, two Boolean annotations may be used: Required and Trigger, and an edge may have any combination of these annotations, leading to four different types of dependency. These annotations then define the order in which statements and iterative loops are arranged. If an edge from A to B is annotated with Required then "B requires A" which means that A must be initialized to a non-uniform value before initializing B. If the edge is annotated with Trigger, then "A triggers B" or equivalently "A invalidates B", which means that B must always be consistent with the latest value of A and therefore that B must be updated before being used. Directed cycles of Required edges are not allowed and are nonsensical; directed cycles of Trigger edges may (in some implementations) not be allowed in order to reduce the complexity.

In constructing the iteration schedule (in block 501), only invalidation constraints are considered (the "B requires A" constraints are handled by the initialization schedule) and at any point of the schedule, each message can be labeled as valid or invalid. A message is invalid if it is the target of a Trigger and it has not been updated since the source of the trigger was updated. Otherwise it is valid. At the beginning of the schedule, all messages are assumed to be valid, and at the end of the schedule all messages are updated so that they are valid. According to the constraint above, an invalid message cannot be used to compute another message; thus in a sense, invalid messages block the schedule.

The scheduler works sequentially, building up the schedule one node at a time. The scheduler uses lookahead to avoid being blocked by invalid messages. Specifically, for each node the scheduler pre-computes its trigger tree, which is the set of nodes reachable from that node by following Trigger edges. The trigger tree of A thus contains all the nodes that will eventually be invalidated by updating A. Since all messages must be valid at the end of the schedule, by updating A all nodes in A's trigger tree must subsequently be updated.

The scheduler then applies the following conservative rule: A is updated only if none of the nodes in A's trigger tree are blocked, i.e. all sources for the nodes in A's trigger tree are valid. For example, suppose A triggers B and B depends on C. A is therefore only updated if C is valid. This rule guarantees that all nodes in A's trigger tree can eventually be updated, and therefore the scheduler will never be completely blocked.

Figure 6:
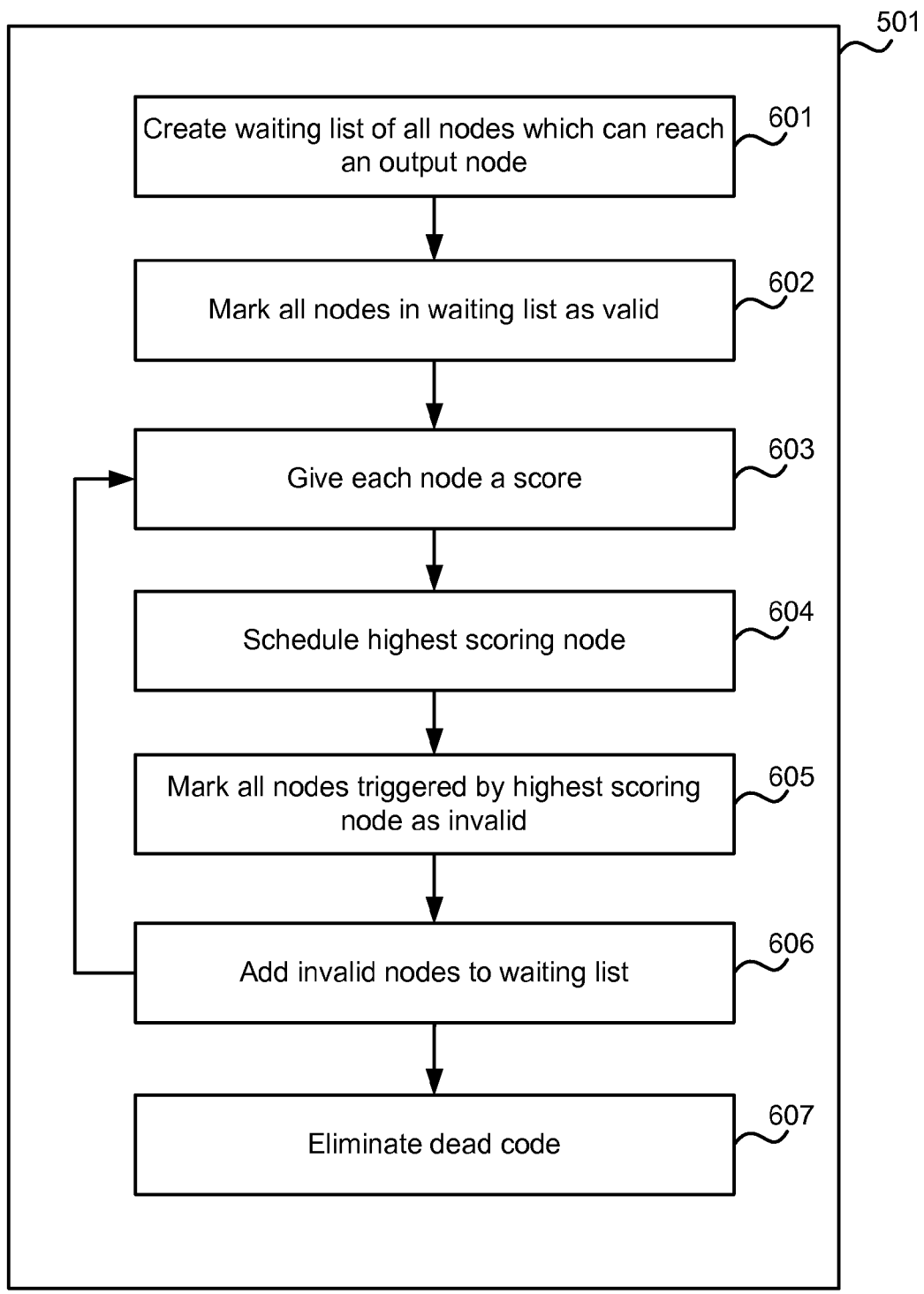
FIGS. 6 and 7 show example implementations of method blocks from FIG. 5 in more detail.

As shown in FIG. 6, the scheduler maintains a list of nodes waiting to be scheduled, and marks them as valid or invalid. The initial list (created in block 601) corresponds to all nodes which can reach an output node, and they are all marked valid (block 602). Each waiting node is given a heuristic score (block 603), and the highest scoring node is scheduled next (block 604). The score considers various features such as the number of source nodes which are already scheduled, and the number of target nodes that would be made invalid. Source nodes and target nodes are defined as follows: if there is an edge from A to B, A is referred to as a source node for B and B is referred to as a target node for A. Nodes which violate the above rule (that A is updated only if all sources for the nodes in A's trigger tree are valid) are given the worst possible score (in block 603). When a node is scheduled (in block 604), every node that it triggers is marked invalid (block 605) and added to the waiting list if not already there (block 606). The process (blocks 603-606) is repeated to schedule all nodes in the waiting list.

The above algorithm, because it is conservative, may schedule a node more times than it is needed. Therefore a dead code elimination step (block 607) may be used that scans the schedule and prunes updates whose value is never used before the next update in cyclic order. For example, suppose A invalidates B, and the optimal schedule begins with B and ends with A. Since the scheduler conservatively tries to leave all nodes valid, it appends a redundant update of B at the end. The dead code elimination step 607 detects and removes this redundant update.

The dead code elimination (in block 607) is an example of post processing which may be performed on the iteration schedule. Another post-processing step (not shown in FIG. 6) is to extract statements from the iteration schedule whose inputs never change. These statements may be put into the initialization schedule instead.

The initialization schedule is used to satisfy Required constraints that are not already satisfied by the iteration schedule. By inspecting the iteration schedule, the set S of nodes which need to be initialized to non-uniform values can be determined (in block 502). A scheduling algorithm similar to that described above with reference to FIG. 6 is then run (in block 503), where the set of output nodes is S. An example of such an algorithm is shown in FIG. 7 and described below.

Invalidations are also relevant for the initialization schedule: from the iteration schedule the set of nodes whose value is used before it is updated can be identified. These nodes must be valid (but not necessarily initialized) at the end of the initialization. For example, suppose A invalidates B, C depends on (but does not require) B, and the iteration schedule begins with C. If the initialization schedule does not update A, then it does not have to worry about initializing B. But if the initialization schedule does update A, then it must subsequently update B. If not initialized, a uniform distribution is used for B. The term 'initialize' is used to mean 'set to a non-uniform distribution'.

Figure 7:
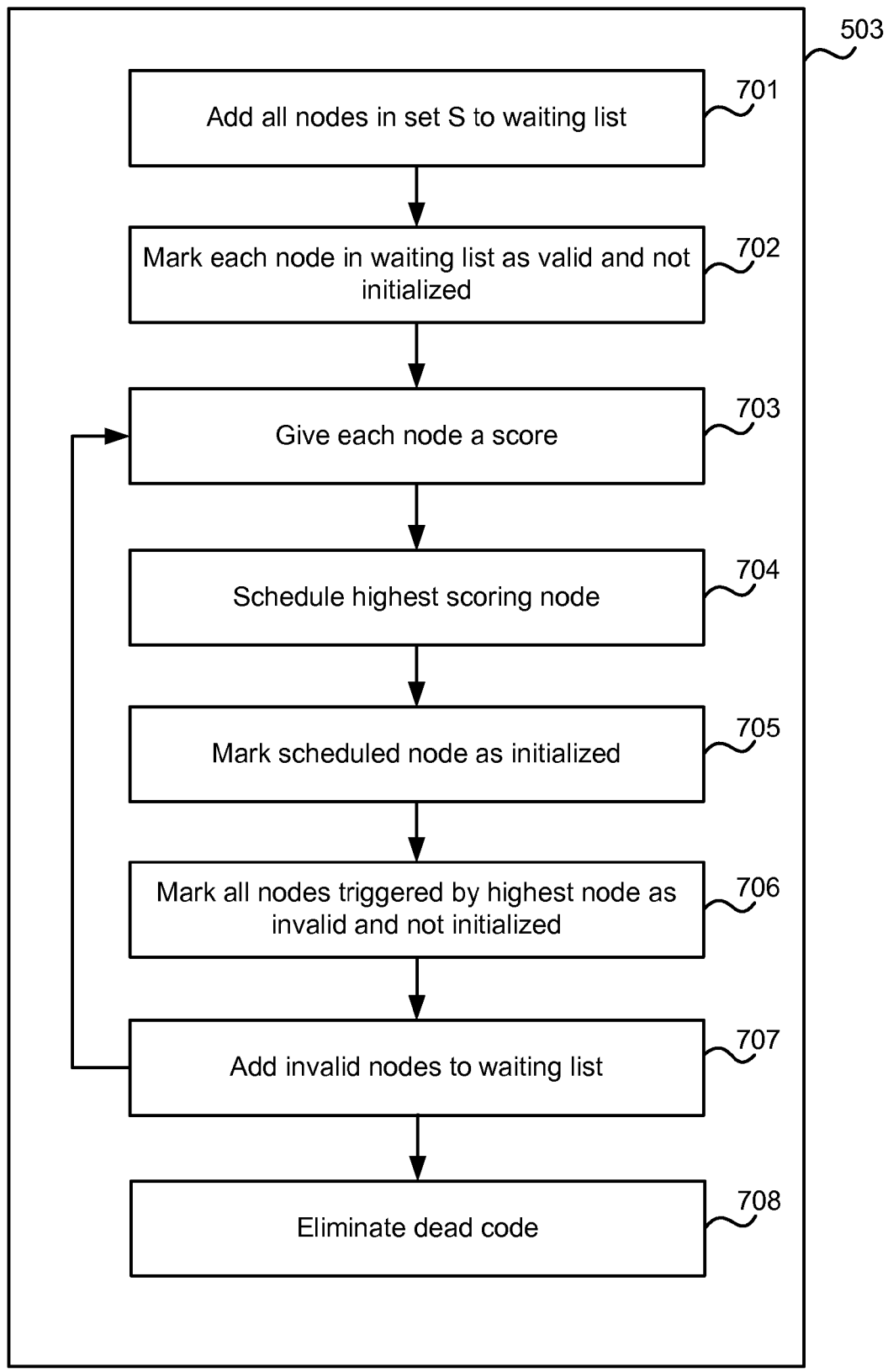

An example of the scheduling algorithm is shown in FIG. 7. This algorithm is similar to that used for the iteration schedule, except now each node is also marked with whether it has been initialized (in blocks 702, 705 and 706). A node is given the worst possible score (in block 703) if it requires an un-initialized node. Post-processing, such as dead code elimination (block 708), may be used in the scheduling algorithm.

The iterative process transform 305 takes the output of the scheduling transform and converts it into a class that implements the IterativeProcess interface. Each program variable in this class corresponds to a message. This class is laid out as follows:

There is a field for each message and each given value.
Reset( ) initializes message arrays and certain constants.
Initialise( ) contains statements from the initialization schedule.
Update( ) contains statements from the iteration schedule.
SomeVariableMarginal( ) returns the marginal distribution of SomeVariable.
SomeVariableOutput( ) returns a message relating to the variable SomeVariable which can facilitate external computations about SomeVariable. For example, it may allow the variable to be shared between multiple model instances. In many examples this is the likelihood message for an output variable (i.e. the marginal divided by the prior).

In an example implementation, the transform works as follows:

Method parameters (they correspond to givens) are turned into fields.
The Reset( ) method collects:
  all variable declarations with an initializer.
  all assignments to IsConstant variables.
Of the remaining statements, statements inside a while loop are put into Update( ). Other statements are put into Initialise( ).
The method SomeVariableMarginal( ) is created for every variable used as an argument to InferNet.Infer.
The method SomeMessageOutput( ) is created for every message whose DependencyInformation has IsOutput=true.

The methods described above provide an automatic way of generating inference source code which can be compiled to form a compiled algorithm and subsequently executed to analyze and explore a system of interest. The intermediate representations are maintained in code form instead of specialized graph data structures. The output is also code, which may provide easy integration with other code, scalability, and enables use of existing tools for debugging code. For example, break points may be inserted within the output code to enable a user to step through the inference analysis. In another example the compiled algorithm may be integrated with other NET code (e.g. to create the image classifying application described above).

The methods described are also extendable to new inference algorithms and inference problems. A registry of different message computation operators for different algorithms may be maintained and updated as required to introduce new inference algorithms. Inference algorithms may also be updated by changing entries in the registry.

Figure 8:
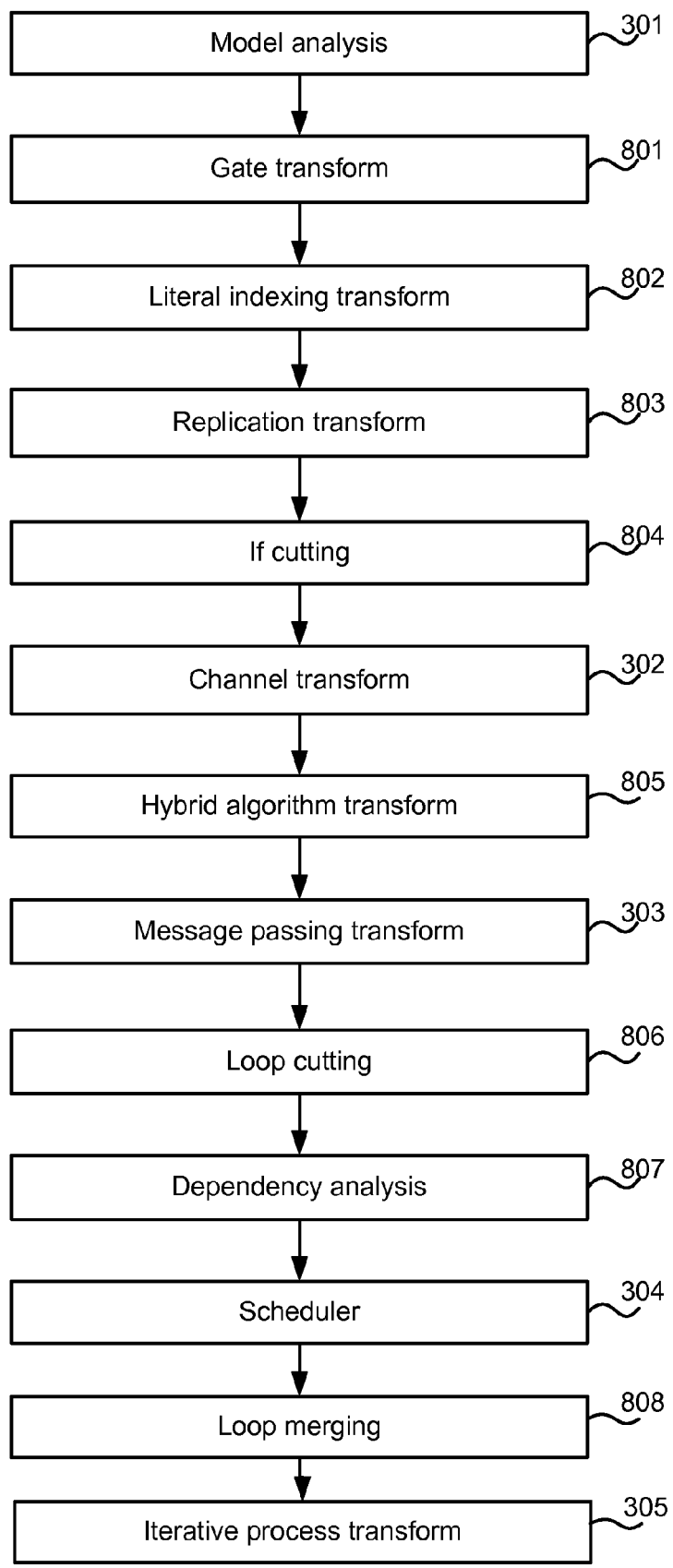
FIG. 8 shows a flow diagram of another example method of operation of a model compiler.

FIG. 3, described above, shows a flow diagram of an example method of operation of the model compiler which comprises five actions. Further example methods may include additional actions. In such further example methods, the core structure may remain the same as that shown in FIG. 3 and described above but additional transforms may provide support for additional model definition elements, such as arrays, loops and conditional statements. FIG. 8 shows a flow diagram of another example method of operation of the model compiler which comprises a number of additional actions. It will be appreciated that a method may comprise some or all of these additional actions and in some cases the nature of the model definition may determine whether some of the additional actions are used, i.e. some of the additional actions are opportunistic in that they are only applied where a particular model definition element exists in the code.

The additional actions shown in FIG. 8 are:

Gate transform 801
  This transform supports conditional program statements (such as if and switch) when the condition is itself random. These are converted into a programmatic form of a mixture model.
Literal indexing transform 802
  This transform supports constant array indexing such as a[0], by transforming such references into a separate variable, e.g. variable a_item0.
Replication transform 803
  Supports loops by replicating any variables that are referenced in a loop, so that each reference is a unique variable.
If cutting transform 804
  This transform splits if statements so that each body contains one statement. This facilitates the creation of channels for evidence messages.
Hybrid algorithm transform 805
  This transform inserts additional message operators at the boundaries between parts of the program where different inference algorithms are being used. These operators convert messages suitable for one algorithm into messages suitable for the other.
Loop cutting transform 806
  This transform cuts 'for' loops, so that each statement in the original loop ends up in a loop by itself. This facilitates dependency analysis and scheduling.
Dependency analysis 807
  This analysis determines dependencies between statements in the code. The analysis may alternatively be integrated within the message passing transform 303 (described above) and updated by subsequent transforms.
Loop merging 808
  This transform merges adjacent loops which have the same form.

Whilst these actions may be performed in different orders, in some embodiments the order of actions is important and the actions may be performed in the order shown in FIG. 8, although not all the actions shown may be performed. The additional actions are described in more detail below.

The gate transform 801 handles if and switch statements with stochastic arguments. There are 3 kinds of conditional statements which may be used in the model definition:
    if statement
    switch statement with a separate case for each value. This is abbreviated as switch/case. It is equivalent to a series of if/else statements.
    switch statement with a default branch handling all values. This is abbreviated as switch/default.

The transform splits any externally declared variables into a number of clones (e.g. two clones for an if statement and two or more clones for a switch statement) which are linked by exit/enter functions as can be described with reference to the examples shown in FIG. 9.

Figure 9:
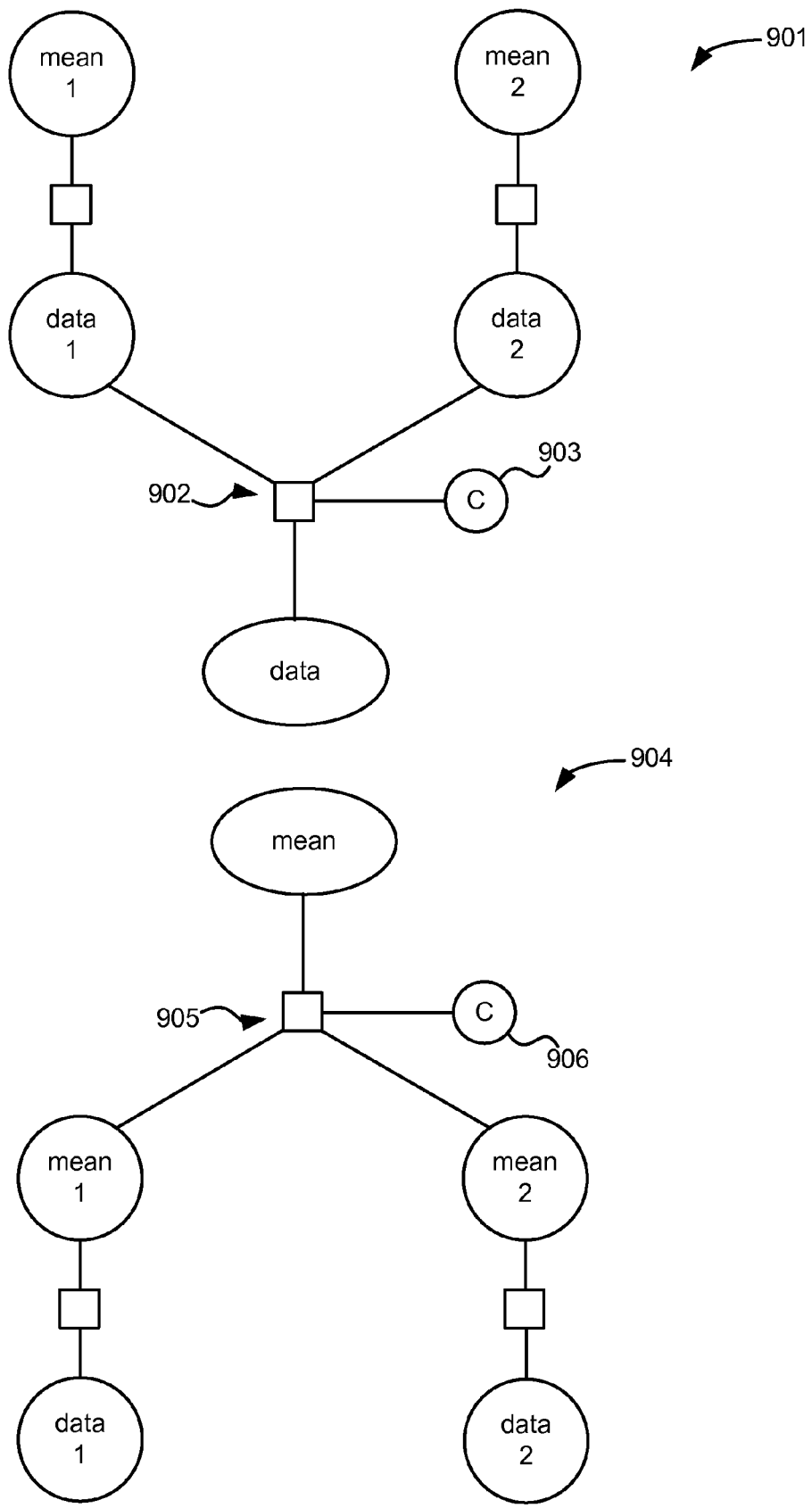
FIG. 9 shows graphical representations of two examples of a gate transform.

In the first example 901 shown in FIG. 9, data (data) is sampled from a Gaussian with one of two means (mean1 and mean2), e.g.

```
if c
    data=Factor.Gaussian(mean1)
if !c
    data=Factor.Gaussian(mean2)
```

In this example the data variable (data) is duplicated (data1 and data2) and the original variable is linked to the duplicates by an exit function 902. The value of a condition variable c 903 (e.g. c or !c) controls the if statement and determines the message flow in the graph. Later in the message-passing transform, each function will send a side message to the condition variable c 903. For example, the side message may be the average value of the function. In the example, this is the probability of the data under mean1 or mean2 respectively. In general, the condition variable must receive the 'model evidence' or 'marginal likelihood' of the statements in each branch. This is done by multiplying together an 'evidence message' from all functions in the body of the branch. In the second example 904 shown in FIG. 9, an unknown mean is used to either sample data1 or data2, depending on the value of c, e.g.

```
if c
    data1 = Factor.Gaussian(mean)
if !c
    data2 = Factor.Gaussian(mean)
```

In this example, the mean variable is duplicated (mean1 and mean2) and the original variable is linked to the duplicates by an enter function 905. Again the value of c 906 determines the message flow in the graph.

By performing the gate transform, messages for each case are superimposed rather than mixed. Variables are duplicated within an if statement and merged outside the if statement and this is gated by an enter/exit function 905, 902. By creating enter/exit functions, the other transforms described herein do not require any changes in order to handle if and switch statements.

The following description describes an implementation of the gate transform in more detail. The condition variable is split into multiple boolean variables, one for each case. These are stored in an array called c_cases which is initialized by Gate.Cases. The c_cases array is given the DoNotSendEvidence attribute. This attribute prevents the c_cases array from generating evidence messages to an enclosing if or switch statement. Each statement inside the body is wrapped by a new if statement on one of the case variables above. These if statements indicate that an evidence message is needed from the statement to the case variable. If the statement is a for loop, the wrapping happens to its body (as if the loop were unrolled). After the transform, these wrapped ifs are all that remains from the original conditional. In particular, there will be no more switch statements. A switch/default statement is treated like a for loop with an if statement inside.

A random variable that is used inside the conditional but initialized outside the conditional is referred to as an enter variable (e.g. mean in the second example 904 in FIG. 9). An enter variable is split by the transform into multiple clones, one for each case (e.g. mean1, mean2 in the example). The clones are initialized by Gate.Enter, Gate.EnterPartial, or Gate.EnterOne as appropriate (enter function 905). Gate.Enter creates a clone for every case. Gate.EnterPartial creates a clone for a subset of cases, for example, if the variable is used in the else clause only. Gate.EnterOne creates one clone only, for situations when the compiler can easily determine that the variable is used in only one case.

A random variable that is initialized inside the conditional and subsequently used outside the conditional is referred to as an exit variable (e.g. data in the first example 901 in FIG. 9). An exit variable is first defined in terms of separate clones, one inside each case (e.g. data1, data2 in the example) and then the clones are merged by Gate.Exit (exit function 902).

The following tables show examples of the transforms that may be performed. The first table shows transforms for if statements:

| Input | Output |
| --- | --- |
| if(c) {<br>  bool b = Factor.Bernoulli(0.1);<br>  Constrain.True(b);<br>} | bool[ ] c_cases = new bool[2];<br>c_cases = Gate.Cases(c);<br>if(c_cases[0]) {<br>  bool b = Factor.Bernoulli(0.1);<br>  Constrain.True(b);<br>} |
| if(c) {<br>  Constrain.EqualRandom(x, constDist);<br>} | bool[ ] c_cases = new bool[2];<br>c_cases = Gate.Cases(c);<br>bool[ ] x_cond_c = new bool[1];<br>x_cond_c = Gate.EnterPartial(c_cases, x, 0);<br>if(c_cases[0]) {<br>  Constrain.EqualRandom(x_cond_c[0], constDist);<br>} |
| if(c) {<br>  double sum = Factor.Sum(array);<br>} | bool[ ] c_cases = new bool[2];<br>c_cases = Gate.Cases(c);<br>bool[ ][ ] array_cond_c = new bool[1][ ];<br>for(int _gateind = 0; _gateind < 1; _gateind++) { |

-continued

| Input | Output |
|---|---|
| | `array__cond__c[__gateind] = new bool[3];`<br>`}`<br>`array__cond__c = Gate.EnterPartial(c__cases, array, 0);`<br>`if(c__cases[0]) {`<br>`  double sum = Factor.Sum(array__cond__c[0]);`<br>`}` |
| `for(int i = 0; i < 3; i++) {`<br>`  if(c[i]) {`<br>`    bool b = Factor.Bernoulli(0.1);`<br>`    Constrain.True(b);`<br>`  }`<br>`}` | `for(int i = 0; i < 3; i++) {`<br>`  bool[ ] c__i__cases = new bool[2];`<br>`  c__i__cases = Gate.Cases(c[i]);`<br>`  if(c__i__cases[0]) {`<br>`    bool b = Factor.Bernoulli(0.1);`<br>`    Constrain.True(b);`<br>`  }`<br>`}` |
| `for(int i = 0; i < 3; i++) {`<br>`  if(c[i]) {`<br>`    Constrain.EqualRandom(array[i], constDist);`<br>`  }`<br>`}` | `for(int i = 0; i < 3; i++) {`<br>`  bool[ ] c__i__cases = new bool[2];`<br>`  c__i__cases = Gate.Cases(c[i]);`<br>`  bool[ ] array__i__cond__c = new bool[1];`<br>`  array__i__cond__c = Gate.EnterPartial(c__i__cases, array[i], 0);`<br>`  if(c__i__cases[0]) {`<br>`    Constrain.EqualRandom(array__i__cond__c[0], constDist);`<br>`  }`<br>`}` |
| `if(c) {`<br>`  for(int i = 0; i < 3; i++) {`<br>`    Constrain.EqualRandom(array[i], constDist);`<br>`  }`<br>`}` | `bool[ ] c__cases = new bool[2];`<br>`c__cases = Gate.Cases(c);`<br>`for(int i = 0; i < 3; i++) {`<br>`  bool[ ] array__i__cond__c = new bool[1];`<br>`  array__i__cond__c = Gate.EnterPartial(c__cases, array[i], 0);`<br>`  if(c__cases[0]) {`<br>`    Constrain.EqualRandom(array__i__cond__c[0], constDist);`<br>`  }`<br>`}` |

Exit Variable Example:

| Input | Output |
|---|---|
| `bool x;`<br>`if(c) {`<br>`  x = Factor.Bernoulli(p);`<br>`  Constrain.EqualRandom(x, constDist);`<br>`} else {` | `bool x;`<br>`bool[ ] c__cases = new bool[2];`<br>`c__cases = Gate.Cases(c);`<br>`bool[ ] x__cond__c = new bool[2];`<br>`if(c__cases[0]) {`<br>`  x__cond__c[0] = Factor.Bernoulli(p);` |

-continued

| Input | Output |
|---|---|
| `  x = Factor.Bernoulli(q);`<br>`}` | `  Constrain.EqualRandom(x__cond__c[0], constDist);`<br>`}`<br>`if(c__cases[1]) {`<br>`  x__cond__c[1] = Factor.Bernoulli(q);`<br>`}`<br>`x = Gate.Exit(c__cases, x__cond__c);` |

Alternative Method:

| Input | Output |
|---|---|
| `if(c) {`<br>`  for(int i = 0; i < 3; i++) {`<br>`    Constrain.EqualRandom(array[i], constDist);`<br>`  }`<br>`}` | `bool[ ] c__cases = new bool[2];`<br>`c__cases = Gate.Cases(c);`<br>`bool[ ][ ] array__cond__c = new bool[1][ ];`<br>`for(int __gateind = 0; __gateind < 1; __gateind++) {`<br>`  array__cond__c[__gateind] = new bool[3];`<br>`}`<br>`array__cond__c = Gate.EnterPartial(c__cases, array, 0);`<br>`for(int i = 0; i < 3; i++) {`<br>`  if(c__cases[0]) {`<br>`    Constrain.EqualRandom(array__cond__c[0][i], constDist);`<br>`  }`<br>`}` |

The Following Table Shows a Transform for a Switch/Case Statement:

| Input | Output |
|---|---|
| switch(i) {<br>  case 0:<br>    bool b = Factor.Bernoulli(0.1);<br>    Constrain.True(b);<br>    break;<br>  case 1:<br>    Constrain.EqualRandom(x, constDist);<br>    break;<br>  case 2:<br>    Constrain.EqualRandom(array[i], constDist);<br>    break;<br>} | bool[ ] i_cases = new bool[3];<br>i_cases = Gate.Cases(i);<br>if(i_cases[0]) {<br>  bool b = Factor.Bernoulli(0.1);<br>  Constrain.True(b);<br>}<br>bool[ ] x_cond_i = new bool[1];<br>x_cond_i = Gate.EnterPartial(i_cases, x, 1);<br>if(i_cases[1]) {<br>  Constrain.EqualRandom(x_cond_i[0], constDist);<br>}<br>bool array_2_cond_i;<br>array_i_cond_i = Gate.EnterOne(i_cases, array[2], 2);<br>if(i_cases[2]) {<br>  Constrain.EqualRandom(array_2_cond_i, constDist);<br>} |

The Following Table Shows Transforms for Switch/Default Statements:

| Input | Output |
|---|---|
| switch(i) {<br>  default:<br>    bool b = Factor.Bernoulli(0.1);<br>    Constrain.True(b);<br>    break;<br>} | bool[ ] i_cases = new bool[3];<br>i_cases = Gate.Cases(i);<br>for(int j = 0; j < 3; j++) {<br>  if(i_cases[j]) {<br>    bool b = Factor.Bernoulli(0.1);<br>    Constrain.True(b);<br>  }<br>} |
| switch(i) {<br>  default:<br>    Constrain.EqualRandom(x[i], constDist);<br>    break;<br>} | bool[ ] i_cases = new bool[3];<br>i_cases = Gate.Cases(i);<br>for(int j = 0; j < 3; j++) {<br>  bool x_i_cond_i = Gate.EnterOne(i_cases, x[j], j);<br>  if(i_cases[j]) {<br>    Constrain.EqualRandom(x_i_cond_i, constDist);<br>  }<br>} |
| bool x;<br>switch(i) {<br>  default:<br>    x = Factor.Bernoulli(const[i]);<br>    Constrain.EqualRandom(x, constDist[i]);<br>    break;<br>} | bool x;<br>bool[ ] i_cases = new bool[3];<br>i_cases = Gate.Cases(i);<br>bool[ ] x_cond_i = new bool[3];<br>for(int j = 0; j < 3; j++) {<br>  if(i_cases[j]) {<br>    bool x_cond_i_j = Factor.Bernoulli(const[j]);<br>    x_cond_i[j] = Factor.Copy(x_cond_i_j);<br>    Constrain.EqualRandom(x_cond_i_j, constDist[j]);<br>  }<br>}<br>x = Gate.Exit(i_cases, x_cond_i); |

If statements are also handled by the if cutting transform 804. This transform takes an if statement and cuts it across the contained statements, so that each is in its own if statement. Declarations and assignments of stochastic variables are placed in separate if statements. For nested if statements, only the innermost if statement is retained. The transform also removes if statements from around:

- Non-stochastic declarations and assignments;
- Array creation statements;
- Infero( ) statements; and
- Declarations and assignments for variables with the DoNotSendEvidence attribute.

The transform may require that the input if statements do not have else clauses (and these may be removed by the gate transform described above). The following table shows examples of the transforms that may be performed:

| Input | Output |
|---|---|
| if (a) {<br>  double prec = 1.0;<br>  double x;<br>  double y = Factor.Random(prior);<br>  bool[ ] barray = new bool[4];<br>  x = Factor.Gaussian(y,prec);<br>  InferNet.Infer(x);<br>} | double prec = 1.0;<br>if (a) {<br>  double x;<br>}<br>if (a) {<br>  double y;<br>}<br>if (a) {<br>  y = Factor.Random(prior);<br>}<br>bool[ ] barray = new bool[4];<br>if (a) {<br>  x = Factor.Gaussian(y,1); |

| Input | Output |
|---|---|
| if (a) {<br>  double x;<br>  if (b) {<br>    double y = Factor.Random(prior);<br>  }<br>} | }<br>InferNet.Infer(x);<br>if (a) {<br>  double x;<br>  }<br>if (b) {<br>  double y;<br>  }<br>if (b) {<br>  y = Factor.Random(prior);<br>} |

The literal indexing transform 802 handles array variables and for each element in an array which is referred to, a variable for that element is created. This breaks up the array and makes it easier to process.

In an example implementation, the literal indexing transform replaces literal array index expressions, such as a[0], with a separate variable e.g. a_item( ). The new variable is related to the expression through Factor.Copy. If the replaced literal expression was on the left hand side of an assignment, then it is assigned Factor.Copy (new variable), otherwise the new variable is assigned to Factor.Copy (original expression). Multiple identical expressions are replaced with the same variable e.g. multiple references to a[0] are all replaced with a_item( ). Only stochastic expressions are transformed. The new declaration and the Factor.Copy is placed in the same loop context as the array declaration, i.e. if an array is declared outside a loop but the index expression is inside, then the new statement is placed outside. The following table shows examples of the transforms that may be performed:

| Input | Output |
|---|---|
| double[ ] x = new double[2];<br>bool[ ] b = new double[3];<br>for(int i=0;i<3;i++) {<br>  b[i] =<br>  Factor.IsPositive(x[0]);<br>} | double[ ] x = new double[2];<br>bool[ ] b = new double[3];<br>double x_item0 = Factor.Copy(x[0]);<br>for(int i=0;i<3;i++) {<br>  b[i] = Factor.IsPositive(x_item0);<br>} |
| double[ ] x = new double[2];<br>x[0] = Factor.Gaussian(0,1);<br>x[1] =<br>Factor.Gaussian(x[0],1); | double[ ] x = new double[2];<br>double x_item0 = Factor.Gaussian(0,1);<br>x[0] = Factor.Copy(x_item0);<br>double x_item1 =<br>Factor.Gaussian(x_item0,1);<br>x[1] = Factor.Copy(x_item1); |

The replication transform 803 ensures that variable expressions in loops are fully-indexed i.e. they are indexed by the loop variables of all containing loops. This is achieved by replicating any expression which is not fully-indexed across all unindexed loops. For example:

| Input | Output |
|---|---|
| for(int i=0;i<10;i++) {<br>  data[i] =<br>Factor.Gaussian(mean,<br>precision);<br>} | for(int i=0;i<10;i++) {<br>  data[i] = Factor.Gaussian(mean_rep[i],<br>precision_rep[i]);<br>} |

The transformation ensures that no two iterations of the loop refer to the same variable. Thus they can all be processed in parallel by subsequent transforms. If the variable being referenced was declared inside one or more loops, then these may be ignored. Only stochastic variables are affected.

This is complicated in some examples by the fact that replication may be jagged. The loop bracketing [i][j,k] means that the sizes of loops over j and k may depend on i but not on each other. In other words, loops can be reordered only within a bracket. In such a loop, if a variable depends on j or k then it must also depend on i (or the variable is declared inside the i loop).

In an example implementation, the transform process for a variable reference inside a loop is as follows. The variable reference is a variable name followed by a list of indexing brackets. Each bracket contains a list of indices which can be literals or loop counters. The variable reference appears in a set of nested loops and these are numbered from outermost to innermost. There is no need to explicitly identify loop brackets. At each step of the transform, there is a current output expression, a current bracket, and a current loop number. The process comprises some or all of the following steps:

Initialize the output expression to the variable name only.
Initialize the bracket to the first bracket, if any.
Initialize the loop number to the outermost loop containing the variable reference but not the variable's declaration.
Find the largest loop number (n) of the loop counters in the current bracket. If the bracket has no loop counters, set n=−1. If there is no current bracket, set n to the number of loops.
While the current loop number is less than or equal to n:
  Let i be the loop counter for the current loop number.
  If any bracket in the variable reference contains i, increment the loop number. Otherwise:
  Create an array that replicates the output expression as many times as i iterates. This array should be created in the innermost loop that contains loop i and all loop counters in the current bracket.
  Set the output expression to this array, indexed by i.
  Increment the loop number.
If there is no current bracket, stop and return the output expression. Otherwise:
Append the current bracket to the output expression.
Move to the next bracket. Recompute n and repeat from there.

The following table shows examples of the transforms that may be performed:

| RHS reference | In loop over | Output | Replication |
|---|---|---|---|
| x | [i][j] or [i,j] | x_rep_i[j] | x_rep = Replicate<double>(x);<br>x_rep_i = Replicate<double>(x_rep[i]); |
| barray | [i][j] | barray_rep_i[j] | barray_rep = Replicate<bool[ ]>(barray);<br>barray_rep_i =<br>Replicate<bool[ ]>(barray_rep[i]); |
| barray[0] | [i] | barray_0_rep[i] | barray_0_rep = Replicate<bool>(barray[0]); |
| barray[i] | [i,j] or [j,i] | barray_i_rep[j] | barray_i_rep = Replicate<bool>(barray[i]); |

| RHS reference | In loop over | Output | Replication |
|---|---|---|---|
| barray[i] | [i][j] | barray_i_rep[j] | barray_i_rep = Replicate<bool>(barray[i]); |
| jarray | [i] | jarray_rep[i] | jarray_rep = Replicate<bool[ ][ ]>(jarray); |
| jarray[i] | [i,j] | jarray_i_rep[j] | jarray_i_rep = Replicate<bool[ ]>(jarray[i]); |
| jarray[i][0] | [i,j] | jarray_i_0_rep[j] | jarray_i_0_rep = Replicate<bool>(jarray[i][0]); |
| jarray[j][i] | [i,j] | jarray[j][i] | none |
| jarray[i][j] | [i][j,k] | jarray_i_j_rep[k] | jarray_i_j_rep = Replicate<bool>(jarray[i][j]); |
| jarray[i][k] | [i][j,k] | jarray_i_rep[j][k] | jarray_i_rep = Replicate<bool[ ]>(jarray[i]); |
| matrix[i,k] | [i,j,k] | matrix_rep[j][i,k] | matrix_rep = Replicate<bool[,]>(matrix); |
| jarray[match1] . . . [matchLast] [const] | [match1] . . . [matchLast,extra1] [extra2] | jarray_match_const_rep [extra1] jarray_extra1_rep[extra2] | jarray_match_const_rep = Replicate<bool[unmatched]>(jarray [match1] . . . [matchLast][const]); jarray_extra1_rep = Replicate<bool[ ][unmatched]> (jarray_match_$_{const}$_rep[extra1]); |

The hybrid algorithm transform 805 allows different algorithms to be applied to different parts of the graph. To use multiple algorithms in a model, a algorithm attribute is used. The transform inserts operators at algorithm boundaries to transform the messages of one algorithm (e.g. EP) into messages suitable for another (e.g. VMP). Through use of algorithm attribute and a hybrid algorithm transform, different algorithms may be combined in any way and the combination may be user defined.

The loop cutting transform 806 transforms loops such that each statement in the loop ends up in a loop by itself. Variables declared inside loops are converted into array variables converted at the top level and references to such variables are modified by adding indices accordingly. An example of a transform is shown in the table below.

| Input | Output |
|---|---|
| for(int i=0; i<10; i++) {<br>  double x;<br>  y[i] = Factor.Random(prior);<br>  z[i] = Factor.Gaussian(y[i],x);<br>} | double[ ] x = new double[10];<br>for(int i=0; i<10; i++) {<br>  y[i] = Factor.Random(prior);<br>}<br>for(int i=0; i<10; i++) {<br>  z[i] = Factor.Gaussian(y[i],x[i]);<br>} |

The cutting of loops in this manner allows for re-ordering statements inside loops (e.g. in the scheduler 304).

The loop merging transform 808 performs the opposite operation to the loop cutting transform 806. After the statements have been re-ordered by the scheduler 304, any adjacent loops, which may be loops which were cut by the loop cutting algorithm 806 and which remained adjacent during the subsequent processing, are merged. An example of such a transform is shown in the table below.

| Input | Output |
|---|---|
| double[ ] x = new double[10];<br>for(int i=0; i<10; i++) {<br>  y[i] = Factor.Random(prior);<br>}<br>for(int i=0; i<10; i++) {<br>  z[i] = Factor.Gaussian(y[i],x[i]);<br>} | for(int i=0; i<10; i++) {<br>  double x;<br>  y[i] = Factor.Random(prior);<br>  z[i] = Factor.Gaussian(y[i],x);<br>} |

The dependency analysis transform 807 annotates each statement with dependency information, indicating which other statements it depends on. These annotations are then used by the scheduler 304 and as described above each dependency may be of one of the following forms:

Declaration dependency: statement A refers to a variable declared in statement B Dependency/requirement/trigger: statement A refers to a variable whose value is modified in statement B The annotation may take the form of a DependencyInformation attribute attached to the statement. The dependency information may also indicate if the statement is an output i.e. it computes a value that has been requested by the user, e.g. Infer( ) statements may be marked as being outputs. As described above, in an embodiment, the dependency analysis transform 807 may be integrated within the message passing transform 303.

Figure 10:
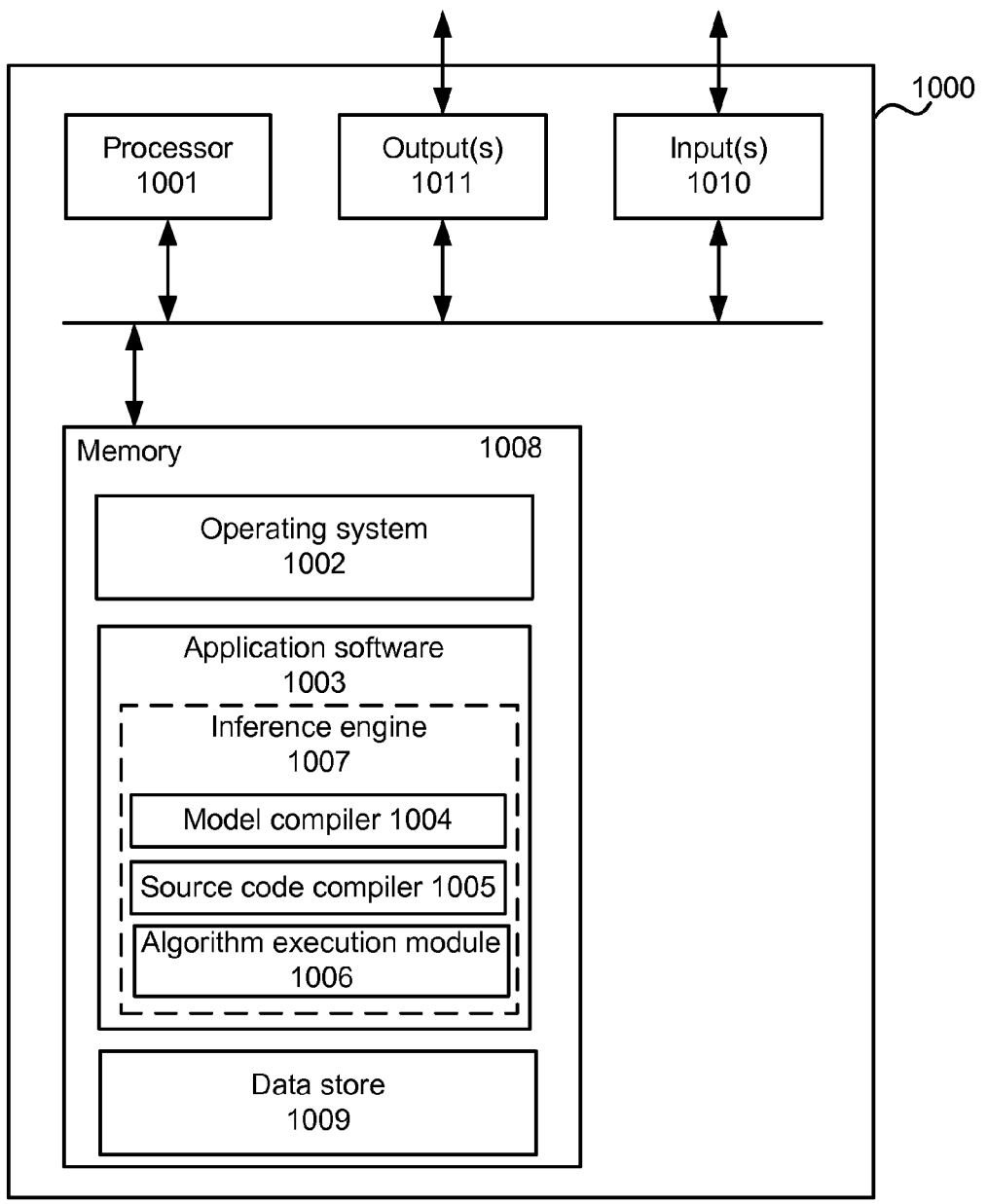
FIG. 10 illustrates an exemplary computing-based device in which embodiments of the methods described herein may be implemented.

FIG. 10 illustrates various components of an exemplary computing-based device 1000 which may be implemented as any form of a computing and/or electronic device, and in which embodiments of the methods described herein may be implemented.

Computing-based device 1000 comprises one or more processors 1001 which may be microprocessors, controllers or any other suitable type of processors for processing computing executable instructions to control the operation of the device in order to compile a model definition into inference source code and/or automatically generate a compiled inference algorithm. Platform software comprising an operating system 1002 or any other suitable platform software may be provided at the computing-based device to enable application software 1003 to be executed on the device.

The application software 1003 may comprise one or more of a model compiler 1004, a source code compiler 1005 (e.g. a C# compiler) and an algorithm execution module 1006. These elements may be combined to form an inference engine 1007 (indicated by the dotted line in FIG. 10). Each of these elements 1003-1007 may comprise device-executable instructions for performing some or all of the method steps described above.

The computer executable instructions may be provided using any computer-readable media, such as memory 1008. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory 1008 may also comprise a data store 1009 which may be used to store a registry of operators for different probabilistic inference algorithms (e.g. BP, EP, VMP), model definitions, inference queries, given values (e.g. user click data), inference settings etc.

The data store 1009 may also be used to store the outputs of the application software, such as the inference source code, the compiled algorithm and the output marginal distributions.

The computing-based device 1000 comprises one or more inputs 1010 which are of any suitable type for receiving media content, Internet Protocol (IP) input, user input etc. One or more outputs 1111 may also provided such as an audio and/or video output to a display system integral with or in communication with the computing-based device. The display system may provide a graphical user interface (e.g. for the inference engine or an application using the compiled algorithm).

Although the present examples are described and illustrated herein as being implemented in a system as shown in FIG. 2, the system described is provided as an example and not a limitation. As those skilled in the art will appreciate, the present examples are suitable for application in a variety of different types of computing systems, e.g. the methods may be implemented in a distributed system.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of automatically generating inference code comprising:
    receiving a model definition and at least one inference query, the model definition comprising a probabilistic program describing a system;
    compiling the model definition to generate source code for performing the at least one inference query,
    wherein compiling the model definition to generate source code for performing the at least one inference query comprises:
    converting declarations and references to random variables in the probabilistic program to channels;
    converting each channel into a pair of messages, the pair of messages comprising a forward message and a backward message;
    inserting message operators into the probabilistic program to compute the messages; and
    scheduling message computations into a linear inference program.

2. A method according to claim 1, further comprising:
    compiling the source code to create a compiled inference algorithm.

3. A method according to claim 2, further comprising:
    receiving at least one of a data set and parameter settings; and
    executing the compiled inference algorithm using said at least one of a data set and parameter settings to produce at least one marginal distribution corresponding to the at least one inference query.

4. A method according to claim 1, wherein scheduling message computations into a linear inference program comprises:
    selecting and sequencing message computations for an iteration block;
    identifying requirements for starting the iteration block; and
    constructing an initialization sequence to produce the requirements.

5. A method according to claim 4, wherein selecting and sequencing message computations for an iteration block comprises:
    (i) creating a list of all message computations which can affect an output;
    (ii) assigning a score to each message computations in the list;

(iii) scheduling a message computation with a highest score;
(iv) adding any message computations affected by the scheduling of the message said message computation to the list; and
(v) repeating steps (ii) to (iv).

6. A method according to claim 1, wherein compiling the model definition to generate source code for performing the at least one inference query further comprises:
analyzing the probabilistic program to identify random variables.

7. A method according to claim 1, wherein compiling the model definition to generate source code for performing the at least one inference query further comprises:
identifying conditional statements in the probabilistic program; and
for each conditional statement:
generating a duplicating a variable within the conditional statement to create a version of the variable for each case associated with the conditional statement; and
replacing the conditional statement with a new conditional statement for each case, each new conditional statement being defined on the version of the variable for the case.

8. A method according to claim 7, wherein compiling the model definition to generate source code for performing the at least one inference query further comprises:
transforming each if statement in the probabilistic program comprising a plurality of contained statements into a plurality of separate if statements.

9. A method according to claim 1, wherein compiling the model definition to generate source code for performing the at least one inference query further comprises:
replacing any references to an element in an array with a reference to a separate variable corresponding to said element.

10. A method according to claim 1, wherein compiling the model definition to generate source code for performing the at least one inference query further comprises:
inserting message operators into the probabilistic program at a boundary between a first part of the program executed using a first probabilistic inference algorithm and a second part of the program executed using a second probabilistic inference algorithm, said message operators being arranged to convert messages suitable for one of said probabilistic inference algorithms into messages suitable for an other of said probabilistic inference algorithms.

11. A method according to claim 1, wherein compiling the model definition to generate source code for performing the at least one inference query further comprises:
transforming each loop in the probabilistic program comprising a plurality of contained statements into a plurality of separate loops each comprising a single statement.

12. A method according to claim 1, wherein compiling the model definition to generate source code for performing the at least one inference query further comprises:
annotating each statement in the probabilistic program with dependency information.

13. One or more tangible device-readable media with device-executable instructions for performing steps comprising:
receiving a probabilistic program describing a system and at least one inference query relating to the system; and
transforming statements in the probabilistic program to generate source code for performing the at least one inference query on the system,
wherein transforming statements in the probabilistic program to generate source code for performing the at least one inference query on the system comprises:
transforming each statement using a variable into a separate channel;
converting each channel into a forward message and a backward message;
inserting message operators into the program to compute each message;
reordering message computations within the probabilistic program to generate a linear inference program.

14. One or more tangible device-readable media according to claim 13, wherein transforming statements in the probabilistic program to generate source code for performing the at least one inference query on the system further comprises:
identifying random variables in the probabilistic program.

15. One or more tangible device-readable media according to claim 13, wherein transforming statements in the probabilistic program to generate source code for performing the at least one inference query on the system further comprises:
converting an inference method in the linear inference program into a class which implements an interface.

16. One or more tangible device-readable media according to claim 13, wherein transforming statements in the probabilistic program to generate source code for performing the at least one inference query on the system further comprises:
identifying a conditional statement in the probabilistic program, the conditional statement relating to a variable;
for each case associated with the conditional statement, creating a version of the variable; and
replacing the conditional statement with a new conditional statement for each case, each new conditional statement relating to a different version of the variable.

17. One or more tangible device-readable media according to claim 13, further comprising:
compiling the source code into a compiled algorithm.

18. A system comprising;
a processor;
memory;
an inference engine stored on the memory and executed by the processor, the inference engine comprising:
a model compiler comprising device executable instructions for converting a probabilistic model defining a system into source code for performing a set of inference queries on the system; and
a source code compiler comprising device executable instructions for compiling the source code,
and wherein the device executable instructions for converting a probabilistic model defining a system into source code for performing a set of inference queries on the system comprise device executable instructions for:
converting declarations and references to random variables into channels;
converting each channel into a pair of messages and inserting message operators to compute these messages; and
re-ordering message computations.

19. A system according to claim 18, the inference engine further comprising:
an algorithm execution module arranged to receive a data set and execute the compiled source code to produce a set of marginal distributions corresponding to the set of inference queries.

20. A system according to claim 19, wherein the algorithm execution module is further arranged to receive inference settings for use when executing the compiled source code to produce the set of marginal distributions.

* * * * *